United States Patent [19]

Kuze

[11] Patent Number: 5,509,269

[45] Date of Patent: * Apr. 23, 1996

[54] THERMO-ACTUATOR

[76] Inventor: Yoshikazu Kuze, 31-3, Higashimagome 1-chome, Ohta-ku, Tokyo, Japan

[ * ] Notice: The portion of the term of this patent subsequent to Jun. 2, 2009, has been disclaimed.

[21] Appl. No.: 44,599

[22] Filed: Apr. 12, 1993

[30] Foreign Application Priority Data

Apr. 15, 1992 [JP] Japan .................................. 4-137481

[51] Int. Cl.$^6$ ...................................................... F03G 7/06
[52] U.S. Cl. ............................................................ 60/527
[58] Field of Search .......................... 60/527, 516; 92/34

[56] References Cited

U.S. PATENT DOCUMENTS

| | | | |
|---|---|---|---|
| 3,308,668 | 3/1967 | Wong | 60/527 |
| 4,095,470 | 6/1978 | Sliger | 60/527 |
| 4,507,921 | 4/1985 | Hammarstedt | 60/527 |
| 4,691,516 | 9/1987 | Fornasari | 60/527 |
| 5,025,627 | 6/1991 | Schneider | 60/527 |
| 5,119,061 | 6/1992 | Kuze | 60/527 |
| 5,177,963 | 1/1993 | Kuze | 337/393 |

Primary Examiner—Ira S. Lazarus
Assistant Examiner—L. Heyman
Attorney, Agent, or Firm—Beveridge, DeGrandi, Weilacher & Young

[57] ABSTRACT

A guide member is slidably mounted on a rod, a resilient seal bag is provided around a first end portion of the rod and secured to the guide member, and a tubular sealing member is slidably mounted on a second end portion of the rod. The rod is inserted in a heat conductive cylinder secured to the guide member, and wax is filled in the heat conductive cylinder. The seal bag has a base portion and a bag portion, and is engaged with the rod only at the base portion to form a gap between the bag portion and the rod. The gap is charged with lubricating oil. The sealing member has a tubular body, a skirt portion, a closed head portion, and a plurality of annular grooves formed in an inner wall of the body. The base portion is secured to the guide member, and the head portion is engaged with an end of the second end portion of the rod. A seal device is provided between the guide member and the rod so as to prevent the lubricating oil in the seal bag from entering in the sealing member.

6 Claims, 6 Drawing Sheets

FIG. 9
FIG. 10
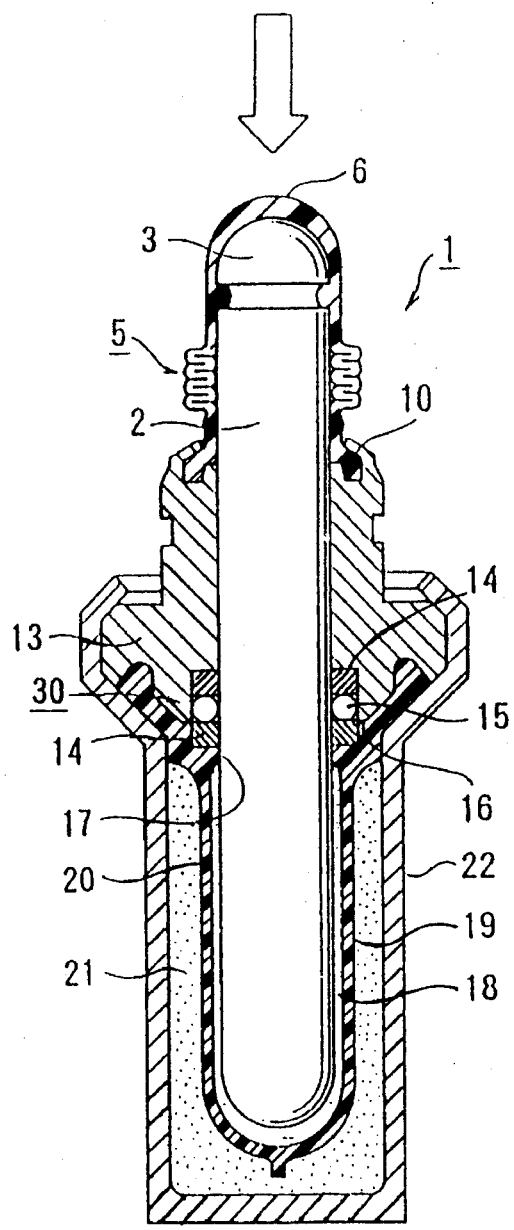
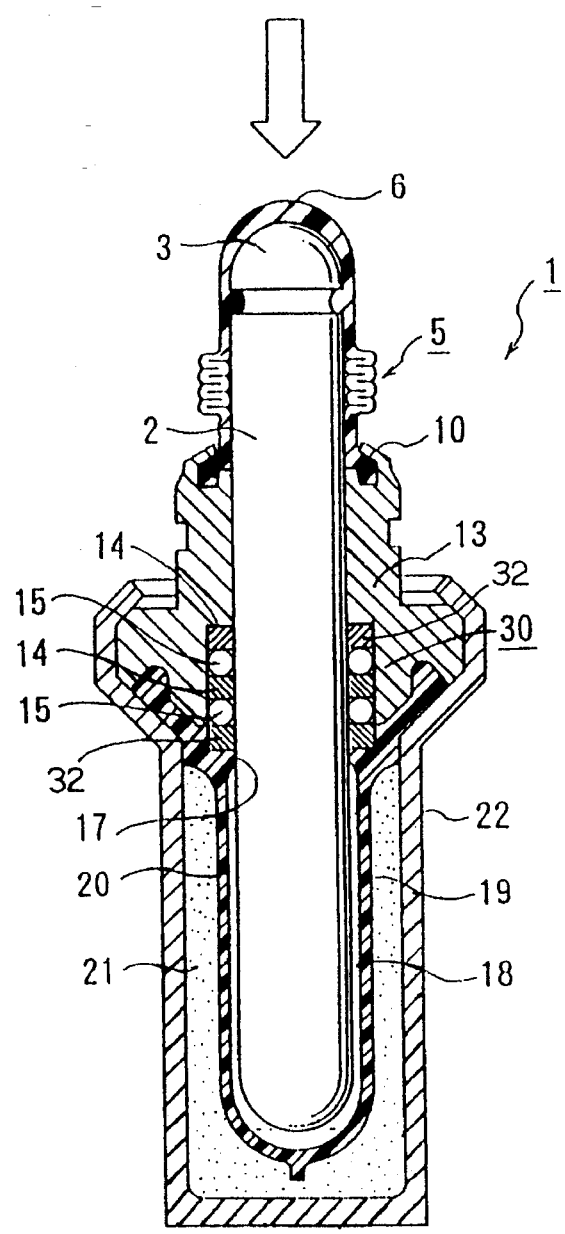

THERMO-ACTUATOR

BACKGROUND OF THE INVENTION

The present invention relates to a thermo-actuator, and more particularly to a thermo-actuator provided in a wax-pellet thermostat for a cooling system of an automotive engine and for various thermo-sensors.

The thermo-actuator in the wax-pellet thermostat includes a steel rod secured to a housing at an end thereof, a guide member slidably mounted on the rod, a main valve secured to the guide member, a seal spool secured to the guide member and provided around the rod, a heat conductive cylinder secured to the guide member and exposed to a coolant, a wax provided in the heat conductive cylinder, and a spring urging the guide member towards the end of the rod.

When the temperature of the coolant rises in excess of a predetermined value of the thermostat, the wax expands. This forces the seal spool against the steel rod. As the wax squeezes the seal spool around the rod, the cylinder moves outwardly together with the guide member against the spring to open the main valve to pass the coolant to a radiator, thereby lowering the temperature of the coolant. When the thermostat cools, the wax contracts, so that the seal spool expands, and the cylinder is moved to the end of the rod by the spring to close the main valve.

In order to seal a sliding portion of the guide member, a dynamic seal such as a packing is provided. However, the coolant includes fine molding sands, fine particles of rusted iron, oil and other particles which form a sludge with antifreeze mixture. Therefore, the conventional seal is liable to be deteriorated because of severe circumstances resulting in shortening the life time of the thermostat.

Heretofore, the maker of automobiles guaranteed the thermostat to operate for one year or 20,000 km of the driving distance. Recently, the guarantee has been extended to five years or 100,000 km. It is difficult to achieve such a guarantee by the thermostat having the conventional seal using a packing or an O-ring.

Meanwhile, in an ordinary thermostat having a valve open lift of 10 mm, the pressure of the wax for lifting the valve becomes very high as 140 kg/cm$^2$ at the lift. To resist the high pressure and to ensure the durability, the seal spool is made to have a large thickness, for example about 1.7 mm. Therefore, in order to compress and deform the thicken and stiff seal spool, a large force of 38 kg/cm$^2$ in the pressure of 140 kg/cm$^2$ is consumed. In addition, there probably occur troubles, such as wear and tear of the seal spool, and sticking of the spool to the rod, because of large friction.

SUMMARY OF THE INVENTION

An object of the present invention is to provide a thermo-actuator in which a sealing means with high durability is provided for sealing an actuating steel rod and a seal device is provided for preventing lubricating oil in a seal bag from leaking and entering the sealing means.

Another object of the present invention is to provide a thermo-actuator where a seal bag provided around the actuating rod has a very small thickness, thereby elongating the life time of the thermo-actuator.

According to the present invention, there is provided a thermo-actuator having an actuating rod, a guide member slidably mounted on the actuating rod, a resilient seal bag provided around a first end of the rod and hermetically secured to the guide member, a heat conductive cylinder housing the seal bag and the rod and secured to the guide member, and wax provided in the heat conductive cylinder to enclose the seal bag.

The seal bag has a base portion and a bag portion defining a hollow, and is engaged with the rod only at the base portion to form a gap between the bag portion and the rod, and the gap is charged with lubricating oil.

The bag portion has a very small thickness, so that the pressure of the lubricating oil is built up to a value equivalent to the pressure of the wax, thereby holding the bag portion in a floating state.

The thermo-actuator further has a tubular sealing member made of rubber, which comprises a tubular body having a straight tubular form in a free condition, a skirt portion, a head portion, and a plurality of nodes so that the tubular body can be shrunken into a bellows.

The tubular body is slidably mounted on a second end portion of the rod, the skirt portion is secured to the guide member through a retainer, and the head portion is secured to the rod at an end of the second end portion of the rod. A seal device is provided between the guide member and the rod so as to prevent the lubricating oil from leaking out of the seal bag and the oil from entering in the sealing member.

Since the bag portion is in a floating state between the wax and the lubricating oil, the bag portion does not participate in lifting the rod. Therefore, the thickness of the seal bag can be reduced, and the life time of the seal bag is elongated.

These and other objects and features of the present invention will become more apparent from the following detailed description with reference to the accompanying drawings.

BRIEF DESCRIPTION OF DRAWINGS

FIGS. 9 and 10 are modifications of the thermo-actuator of the present invention, respectively.

DETAILED DESCRIPTION OF THE PREFERRED EMBODIMENTS

Figure 1:
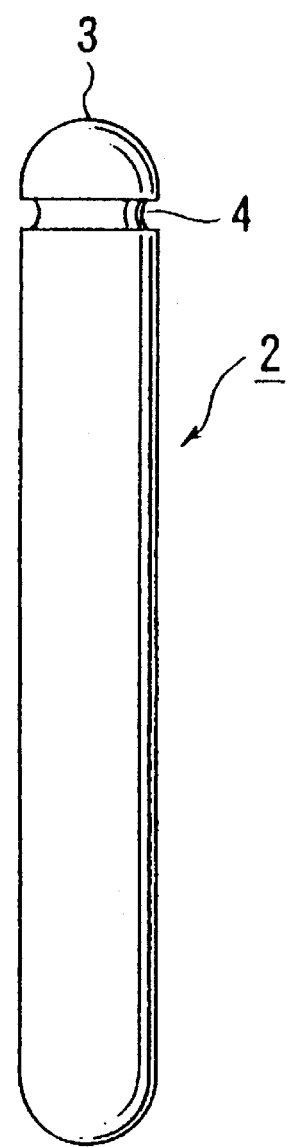
FIG. 1 shows an actuating steel rod provided in a thermo-actuator according to the present invention.

Referring to FIG. 1, an actuating steel rod 2 has a top end 3 and an annular groove 4 formed on an upper portion of the rod 2.

Figure 2:
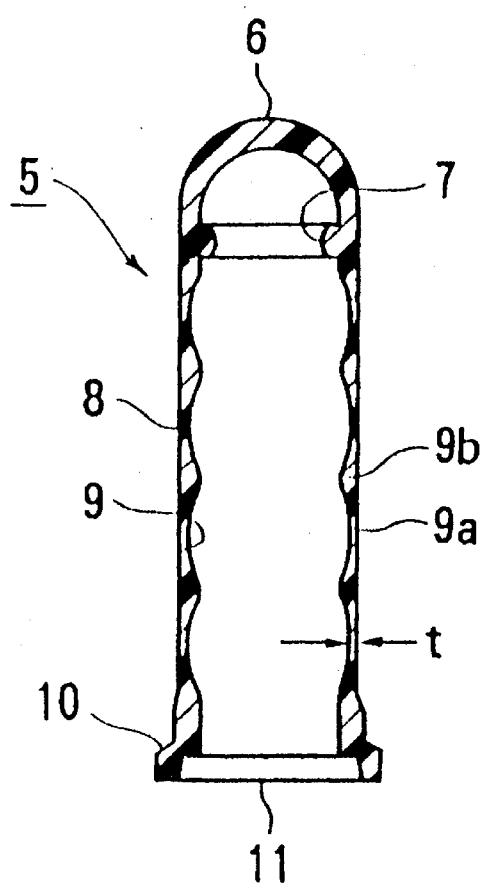
FIG. 2 is a sectional view of a tubular sealing member.

Referring to FIG. 2 showing a tubular sealing member 5, the tubular sealing member 5 is made of rubber and adapted to automatically form a bellows when compressed.

The tubular sealing member 5 comprises a tubular body 8 having a straight tubular form in a free condition. The tubular body 8 has a skirt portion 10, and a head portion 6.

A plurality of annular grooves 9 are circumferentially formed in an inner wall thereof, thereby to form thinner portions 9a and thicker portions as nodes 9b which are alternately disposed. An annular rib 7 is formed on the inside wall of the head portion 6 to be engaged with the annular groove 4 of the rod 2.

Figure 3:
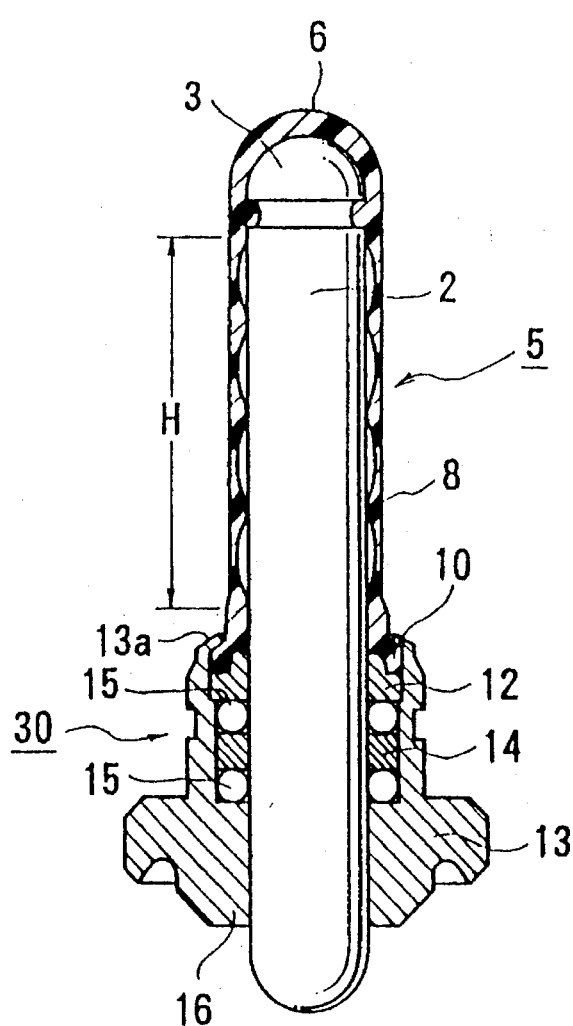
FIG. 3 is a sectional view of a part of the thermo-actuator for explaining the mounting of the tubular sealing member to a guide member.

Referring to FIG. 3, a guide member 13 is slidably mounted on the rod 2. A seal device 30 is mounted in the guide member 13, slidably engaged with the rod 2. The seal device 30 comprises a backup ring 14 (R-L ring), a pair of upper and lower O-rings 15 on opposite sides of the backup ring 14, and a retainer 12 mounted on the upper O-ring 15.

The sealing member 5 is slidably mounted on the steel rod 2. The inside of the closed head portion 6 of the sealing member 5 is engaged with the top end 3 of the steel rod 2 and the annular rib 7 is engaged with the annular groove 4 of the rod 2. The skirt portion 10 is mounted in a seal pocket 13a formed on the guide member 13 and a base portion 11 is engaged with the retainer 12. An outer periphery of the seal pocket 13a is inwardly bent at a predetermined hydraulic pressure so that the sealing member 5 is secured to the guide member 13 with a sealing effect.

Figure 4:
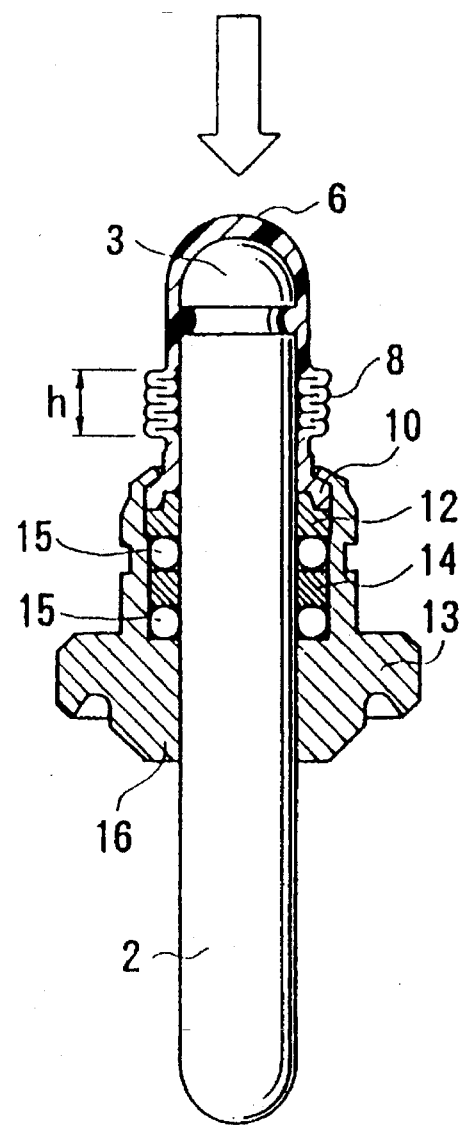
FIG. 4 is a sectional view showing formation of a bellows.

As shown in FIG. 4, when the head portion 6 of the sealing member 5 is pressed down, the steel rod 2 is downwardly moved and the sealing member 5 is automatically shrunken into a bellows. Namely, each thin thickness portion 9a is outwardly projected, where adjacent projections are contacted with each other, so that the length of the sealing member 5 is extremely reduced. For example, if the length H of the tubular body 8 is 18 mm, the length h of the body 8 at the shrinkage becomes 4 mm, and the diameter of the body is 5.6 mm. The thickness t (FIG. 2) of the thin thickness portion 9a of the sealing member 5 is 0.2 mm, and the thickness of the thicker portion 9b is 0.4 mm. The diameter of the rod 2 is 4.8 mm and the number of wrinkles of the bellows is four. The body 8 is shrunken by 14 mm.

In durability tests of the thermo-actuator conducted under the conditions where one cycle time is 6 seconds and the stroke of the rod 2 is 12 mm, no defects were found at 300,000 cycles. The life time of the bellows of the sealing member is extremely elongated.

Figure 5:
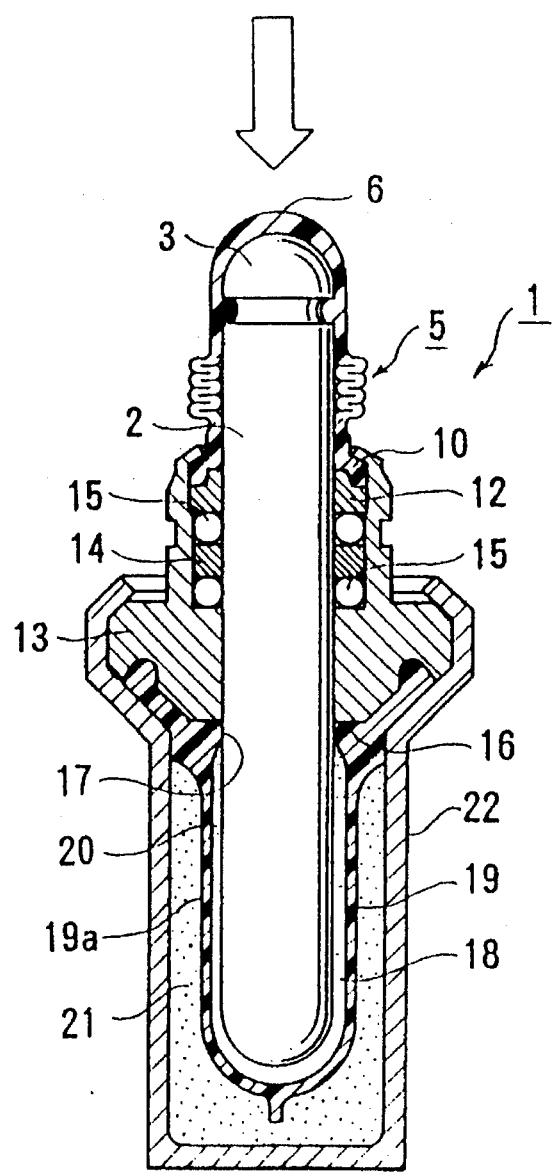
FIG. 5 is a sectional view of the thermo-actuator of the present invention in a rod retracting state.
Figure 6:
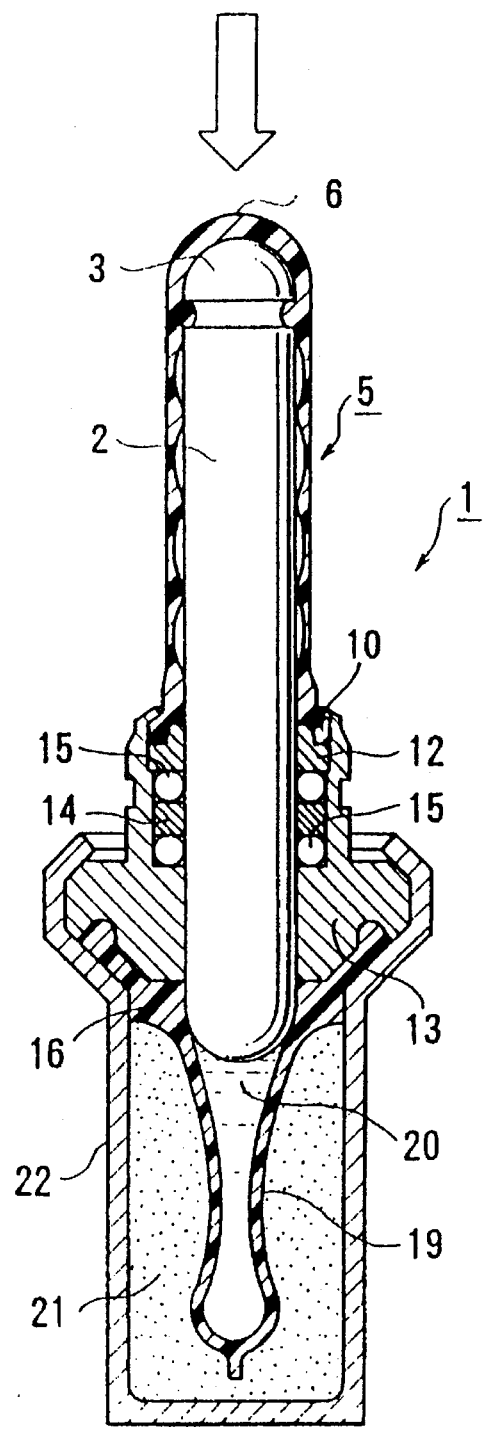
FIG. 6 is a sectional view of the thermo-actuator in a rod projecting state.

Referring to FIGS. 5 and 6 showing a thermo-actuator 1 of the present invention, a resilient seal bag 19 is hermetically secured to the guide member 13. The seal bag 19 is mounted on the rod 2 opposite to the sealing member 5 at a lower portion 16 of the guide member 13.

The seal bag 19 comprises a bag portion 19a and a base portion having an opening 17. The seal bag 19 engages with the rod 2 only at the opening 17 which is slidably mounted on the rod. A gap 18 is formed between the bag portion 19a and the rod 2. The gap 18 is filled with lubricating oil 20. The thickness of the bag portion 19a is reduced to a very small value, 0.3 mm. The gap 18 has the width of 0.3 mm which is approximately equal to the thickness of the seal bag 19. The width of the gap 18 between the lower end of the rod 2 and the bag portion 19a is 1 mm.

The seal bag 19 is inserted in a heat conductive cylinder 22 filled with wax pellet 21. An upper end of the cylinder 22 is securely engaged with the guide member 13, thereby forming the thermo-actuator 1.

When the wax 21 expands with an increase of ambient temperature, the pressure of the wax is increased and the pressure of the lubricating oil 20 also increases to a value equivalent to the pressure of the wax. The pressure of the lubricating oil acts to raise the rod 2 accordingly. FIG. 6 shows the condition where the rod 2 is raised to a maximum lift position of 11 mm. In accordance with the present invention, the rod is lifted by the pressure of the lubricating oil 20, and hence the bag portion 19a is in a floating state between the wax 21 and the lubricating oil 20 which are balanced in pressure. Therefore, the bag portion 19a does not participate in lifting the rod 2.

At an early stage of the expansion of the wax 21, a part of the bag portion 19a adjacent to the base portion is contracted the first to squeeze the rod. Furthermore, the seal device 30 is provided in the guide member 13. Consequently, the lubricating oil 20 in the seal bag 19 is prevented from leaking and entering the sealing member 5. If the lubricating oil 20 enters the sealing member 5, the entering oil prevents the sealing member from shrinking. Thus, the sealing member 5 can be completely shrunken, where adjacent wrinkles engage with each other.

When the ambient temperature decreases, the wax 21 contracts. Accordingly, the rod 2 is lowered by a resilient force of a spring (not shown) to the initial position of FIG. 5.

At that time, the tubular body 8 is automatically wrinkled thanks of thin thickness portions 9a and nodes 9b to form a bellows in which wrinkled portions are contacted with each other, so that the length of the sealing member 5 is largely reduced as shown in FIG. 5.

Figure 7:
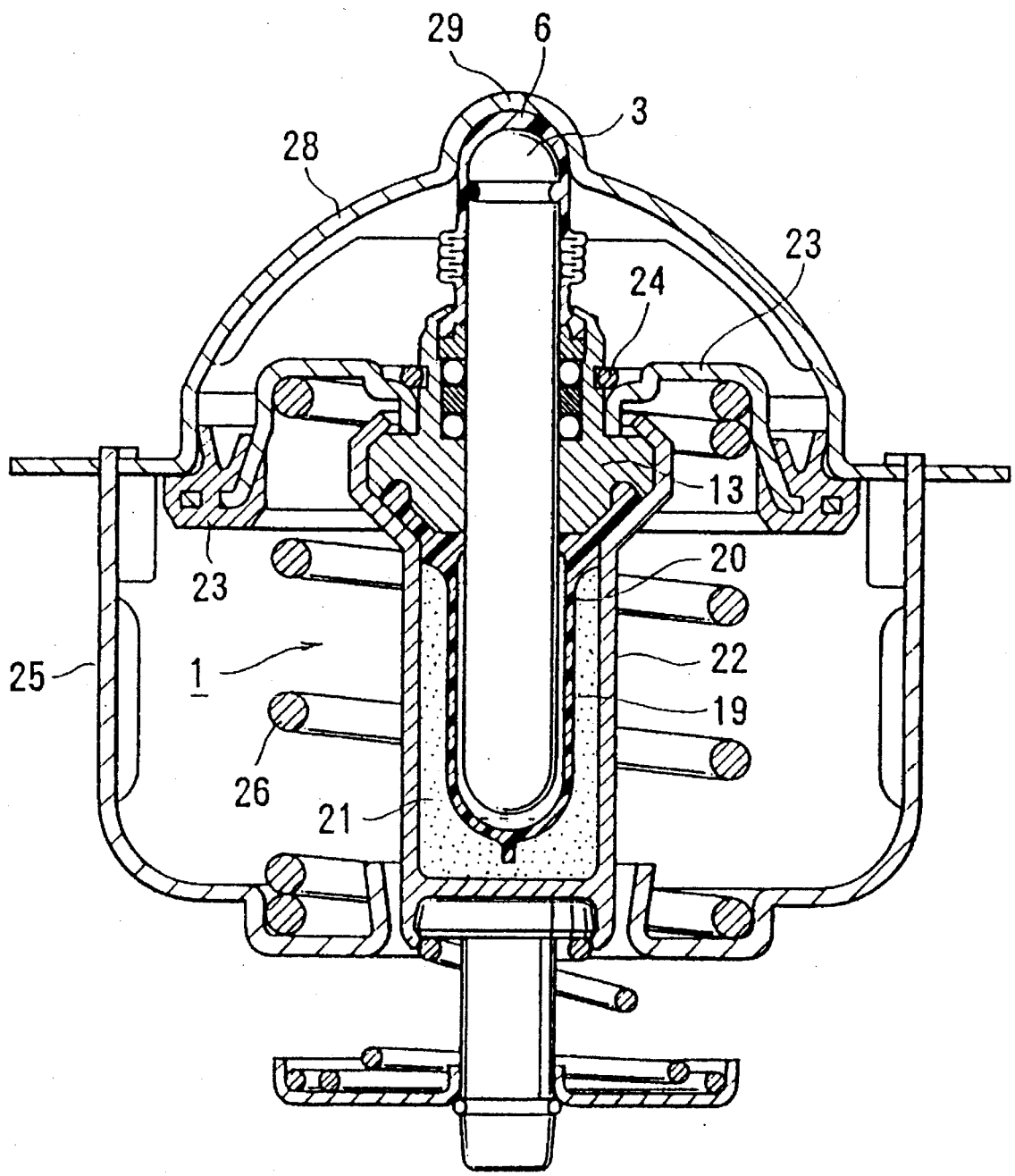
FIG. 7 is a sectional view of a thermostat provided with the thermo-actuator of the present invention in a valve closed state.

FIG. 7 shows a thermostat having the thermo-actuator 1 of the present invention, which is provided for a cooling system of an automotive engine.

Figure 8:
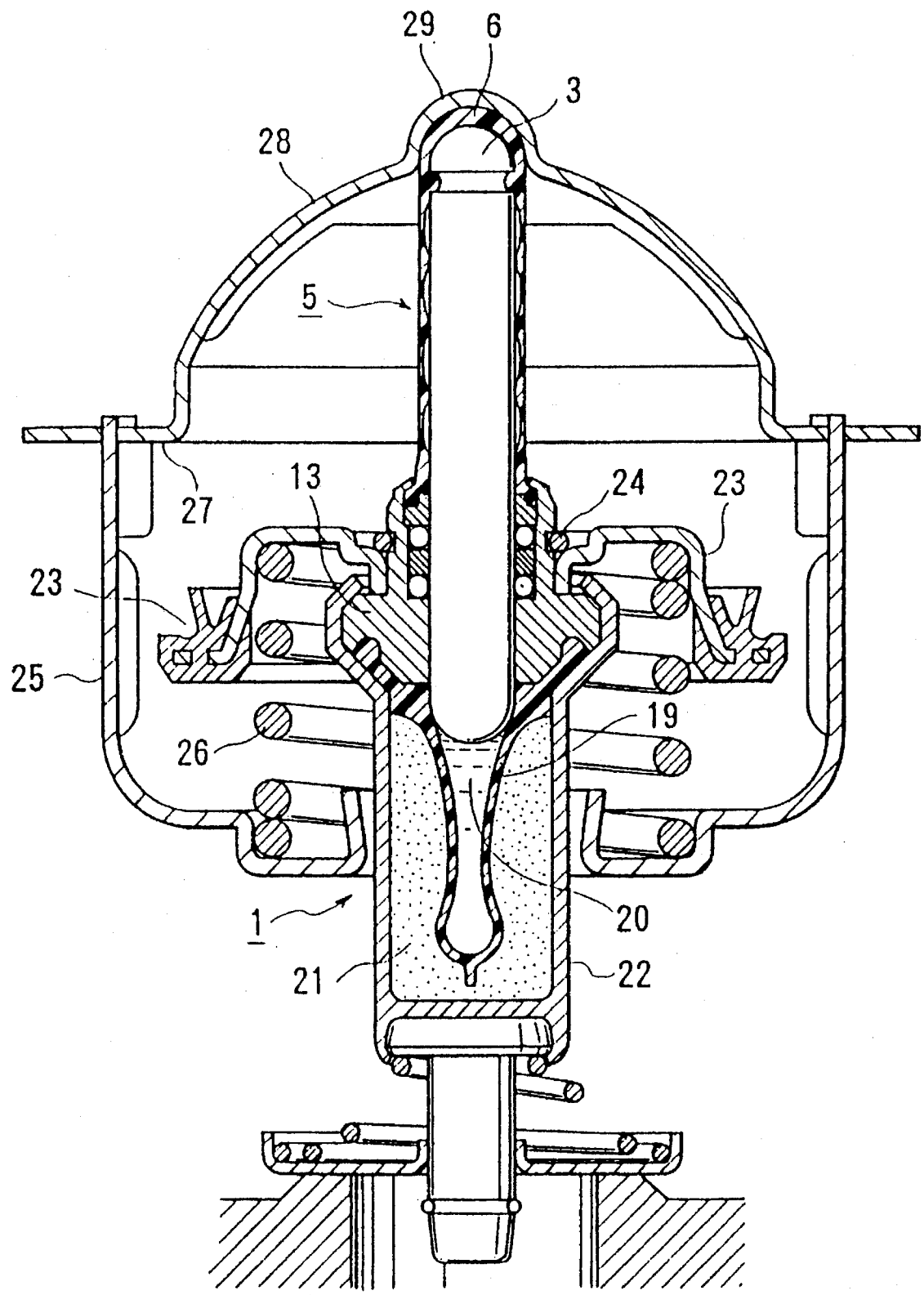
FIG. 8 is a sectional view of the thermostat in a valve opening state.

The thermostat has a housing 28 secured to a wall of a coolant passage of the engine, and a frame 25 secured to the housing 28. The housing 28 has a valve seat 27 (FIG. 8). The steel rod 2 having the sealing member 5 is secured to the housing 28 at a top portion 29, and a primary valve 23 is secured to the guide member 13 by a snap ring 24. A return coil spring 26 disposed surrounding the cylinder 22 is provided between the primary valve 23 and the bottom of the frame 25.

FIG. 7 shows the closed valve state. When the temperature of the coolant in the coolant passage rises in excess of a predetermined value of the thermostat, the expansion of the wax 21 causes the pressure of the lubricating oil 20 to increase up to a value equivalent to the pressure of the wax 21. The pressure of the lubricating oil is exerted on the rod 2 to urge it upwardly. Because the rod 2 is secured, the cylinder 22 of the thermo-actuator 1 is downwardly moved against the force of the spring 26, thereby opening the primary valve 23 as shown in FIG. 8.

When the coolant temperature decreases, the wax 21 contracts. Thus, the coil spring 26 causes the valve 23 to raise to the closed position as shown in FIG. 7. Since the seal device 30 is prevented from the coolant, nothing affects the life time of the device.

In the thermo-actuator shown in FIG. 9, the seal device 30 comprises the lower backup ring 14 provided between the base portion of the seal bag 19 and the rod 2, and the O-ring 15 disposed between the guide member 13 and the rod 2, and the upper backup ring 14 provided between the guide member 13 and the rod 2. In the thermo-actuator of FIG. 10, the seal device 30 has a pair of O-rings 15, the backup ring 14 disposed between the O-rings, and upper and lower backup rings 32.

In the modifications of FIGS. 9 and 10, a part of the seal device 30 is inserted in the base portion of the seal bag. As a result, an annular lip is formed on the inner periphery of the base portion at the opening 17, which grips the rod. Thus, the lubricating oil is perfectly sealed in the seal bag, so that the oil is prevented from leaking by double effects of the seal device and the lip.

Thus, the rod can be smoothly moved in the axial direction with the aid of the lubricating oil, and the tubular body of the sealing member 5 can be sufficiently shrunken into a bellows. In addition, a long life of the thermo-actuator is ensured.

In accordance with the present invention, the resilient seal bag does not participate in moving the rod since the bag portion is in a floating state between the wax and the lubricating oil. Therefore, the thickness of the seal bag can be remarkably reduced, and the life time of the seal bag is very elongated.

Since the tubular sealing member is mounted on the steel rod for sealing the actuating steel rod, the introducing of the coolant and foreign materials through the sliding portion between the steel rod and the guide member is prevented.

Furthermore, the seal device is provided between the guide member and the rod so as to prevent the lubricating oil from leaking out of the seal bag and the oil from entering the sealing member. Thus, the tubular body of the sealing member is completely shrunken into a bellows when compressed.

While the invention has been described in conjunction with preferred specific embodiment thereof, it will be understood that this description is intended to illustrate and not limit the scope of the invention, which is defined by the following claims.

What is claimed is

1. A thermo-actuator having an actuating rod, a guide member slidably mounted on the actuating rod, a resilient seal bag provided around a first end portion of the actuating rod and hermetically sealed to the guide member, a heat conductive cylinder housing the seal bag and the actuating rod and secured to the guide member, wax provided in the heat conductive cylinder to enclose the seal bag, and a tubular sealing member made of rubber slidably mounted on a second end portion of the rod, the improvement comprising:

the seal bag having a base portion secured to the guide member, and a bag portion around the actuating rod with a gap which is filled with lubricating oil;

a seal device comprising an O-ring and a retainer and provided in the guide member around the actuating rod so as to prevent the lubricating oil in the gap from entering the sealing member;

the sealing member having a tubular body having a straight tubular form in a free condition, skirt portion, a head portion, and a plurality of thinner portions and thicker portions which are alternatively disposed so as to be shrunken into a bellows, the skirt portion being secured to the guide member and engaged with the retainer so as to hold the seal device, the head portion being secured to the rod at an end of the second end portion of the rod.

2. A thermo-actuator according to claim 1 wherein each of said thinner portions is an annular groove formed in an inner wall of the tubular body.

3. A thermo-actuator according to claim 1 wherein a part of the seal device is disposed between the base portion of the seal bag and the actuating rod so as to form an annular lip around the rod.

4. A thermo-actuator according to claim 1 further comprising a pair of backup rings and the O-ring being disposed between the backup rings.

5. A thermo-actuator according to claim 1 wherein the seal bag is engaged with the actuating rod only at the base portion to form the gap having a predetermined width between the bag portion and the actuating rod, and the bag portion has a thickness between 20% and 1% of the diameter of the actuating rod.

6. A thermo-actuator according to claim 5 wherein the predetermined width of the gap is approximately equal to the thickness of the bag portion.

* * * * *